US 8,459,851 B2

(12) United States Patent
Wemmer

(10) Patent No.: US 8,459,851 B2
(45) Date of Patent: Jun. 11, 2013

(54) MULTI-MODE LIGHTING APPARATUS

(75) Inventor: Jeffrey M. Wemmer, Odessa, TX (US)

(73) Assignee: BMD Properties, Ltd., Monahans, TX (US)

( * ) Notice: Subject to any disclaimer, the term of this patent is extended or adjusted under 35 U.S.C. 154(b) by 412 days.

(21) Appl. No.: 12/916,224

(22) Filed: Oct. 29, 2010

(65) Prior Publication Data

US 2011/0103088 A1 May 5, 2011

Related U.S. Application Data

(60) Provisional application No. 61/256,817, filed on Oct. 30, 2009.

(51) Int. Cl.
*F21S 11/00* (2006.01)

(52) U.S. Cl.
USPC ........... 362/557; 362/555; 362/554; 362/552; 362/183

(58) Field of Classification Search
USPC .................. 362/551, 552, 554, 555, 557, 576, 362/183, 800; 385/115, 123, 133, 146, 901
See application file for complete search history.

(56) References Cited

U.S. PATENT DOCUMENTS

| | | | | |
|---|---|---|---|---|
| 4,246,477 A | * | 1/1981 | Latter | 250/214 AL |
| 4,297,000 A | * | 10/1981 | Fries | 362/557 |
| 4,525,031 A | * | 6/1985 | Mori | 359/597 |
| 4,589,400 A | | 5/1986 | Mori | |
| 4,928,666 A | | 5/1990 | Mori et al. | |
| 5,022,736 A | * | 6/1991 | Mori | 385/33 |
| 5,152,601 A | * | 10/1992 | Ferng | 362/183 |
| 5,581,447 A | * | 12/1996 | Raasakka | 362/557 |
| 6,037,535 A | * | 3/2000 | Yoshino | 136/246 |
| 6,425,391 B1 | | 7/2002 | Davoren et al. | |
| 6,666,207 B1 | | 12/2003 | Arkas et al. | |

(Continued)

FOREIGN PATENT DOCUMENTS

| | | |
|---|---|---|
| CN | 201434313 | 3/2010 |
| IN | 1051CHE2008 | 11/2009 |

(Continued)

OTHER PUBLICATIONS

PCT: International Search Report and Written Opinion for PCT/US2010/054893 (counterpart application); Jul. 21, 2011; 6 pages.
PCT: International Preliminary Report on Patentability Chapter I of PCT/US2010/054893 (counterpart application); May 1, 2012; 4 pgs.

*Primary Examiner* — Bao Q Truong
(74) *Attorney, Agent, or Firm* — Howison & Arnott, L.L.P.

(57) ABSTRACT

A multi-mode lighting system includes a collector unit having a base including a cavity and a transparent or translucent cover mounted on the base. The system further includes a lighting module having a base, a transparent or translucent cover and a photovoltaic element mounted therein. A plurality of fiber optic filaments extend from the collector to the lighting module to transmit radiation from first ends of the fiber optic filaments to second ends of the fiber optic elements. The first ends of the fiber optic filaments are disposed in an array in the collector unit to receive radiation and second ends are disposed in an array in the lighting module to emit radiation received by the first ends of the fiber optic filaments. Radiation transmitted by the fiber optic filaments illuminates an area external to the lighting module and impinges the photovoltaic element to generate electricity.

20 Claims, 4 Drawing Sheets

U.S. PATENT DOCUMENTS

| | | |
|---|---|---|
| 6,840,645 B2 | 1/2005 | Eisenman et al. |
| 6,958,868 B1 * | 10/2005 | Pender .......................... 359/742 |
| 6,983,093 B2 | 1/2006 | Fraval et al. |
| 7,736,014 B2 | 6/2010 | Blomberg |
| 8,139,908 B2 * | 3/2012 | Moyer .......................... 385/25 |
| 8,313,224 B2 * | 11/2012 | Moyer .......................... 362/554 |
| 2005/0229964 A1 * | 10/2005 | Liao et al. .................... 136/252 |
| 2006/0104081 A1 | 5/2006 | Fraval |
| 2011/0032695 A1 * | 2/2011 | Cumberland et al. ........ 362/183 |
| 2011/0056485 A1 | 3/2011 | Saluccio |

FOREIGN PATENT DOCUMENTS

| | | |
|---|---|---|
| JP | 1997 09-054272 A | 2/1997 |
| KR | 20-0221491 Y1 | 4/2001 |
| KR | 10-2003-0027529 A | 4/2003 |
| KR | 10-0908069 B1 | 7/2009 |
| KR | 10-2009-0097279 A | 9/2009 |

* cited by examiner

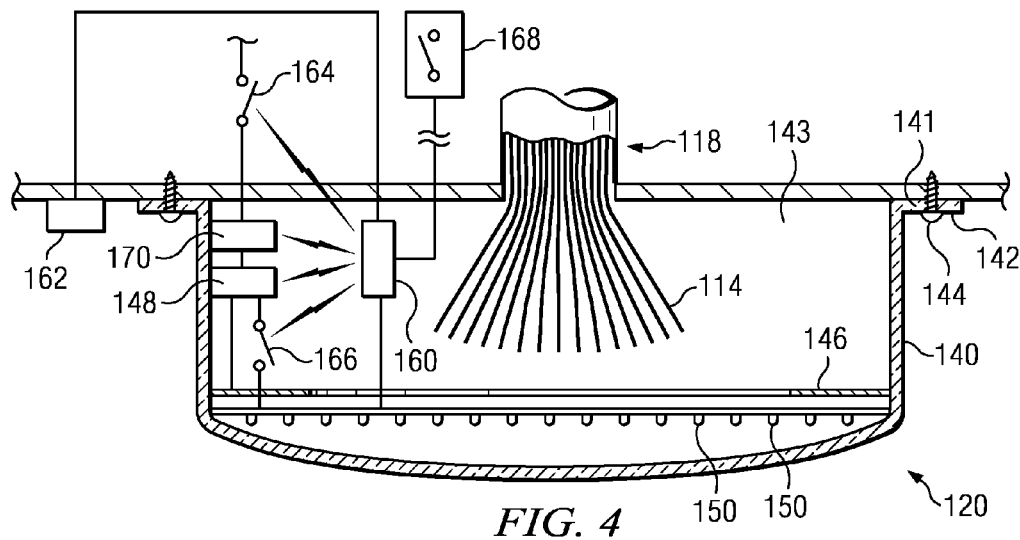
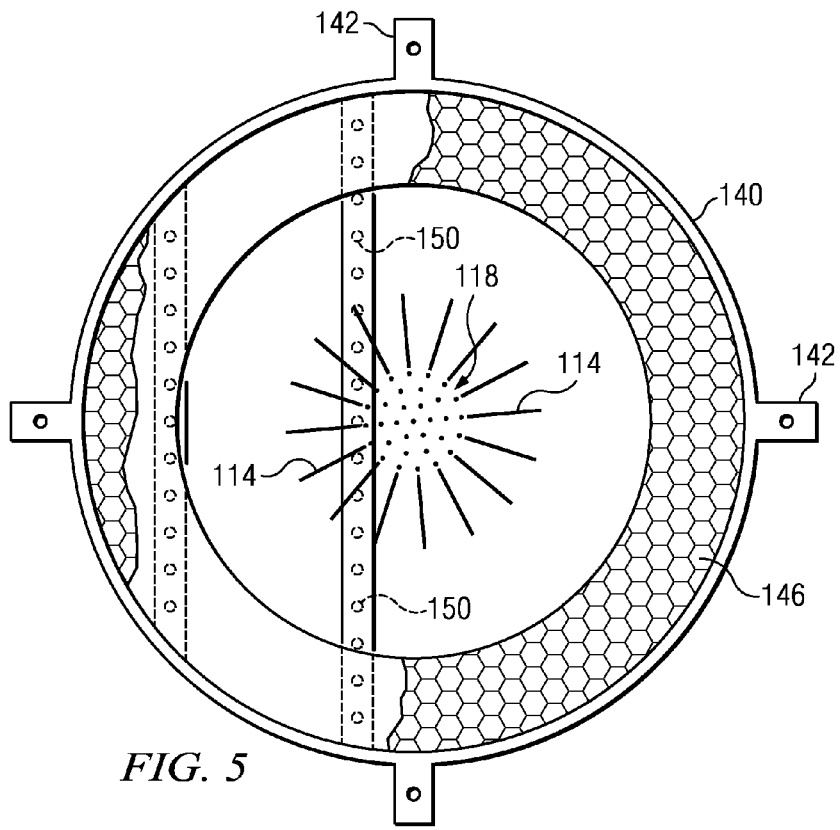

MULTI-MODE LIGHTING APPARATUS

CROSS-REFERENCE TO RELATED APPLICATIONS

This application claims the benefit of U.S. Provisional Application No. 61/256,817, filed on Oct. 30, 2009.

TECHNICAL FIELD

The following disclosure relates to building lighting and, in particular, to a multi-mode lighting apparatus that may be powered by a number of different sources.

BACKGROUND

Issues relating to energy conservation and the use of alternative sources of energy have come to the forefront of public concern. This is particularly true in the case of building lighting. It is anticipated that traditional incandescent light bulbs will soon be legislated out of existence due to inefficiency. However, currently available lighting systems do not provide the necessary flexibility and adaptability to utilize alternative energy sources to reliably provide lighting for interior areas. Thus, there exists a need for reliable systems and methods that utilize alternative energy sources for lighting the interiors of residences and other buildings and simultaneously provide reliable backup lighting in the event that alternative energy sources are not available.

SUMMARY

In one aspect thereof, a multi-mode lighting system includes a collector unit having a base including a cavity and a transparent or translucent cover mounted on the base. The system further includes a lighting module having a base, a transparent or translucent cover and a photovoltaic element mounted therein. A plurality of fiber optic filaments extend from the collector to the lighting module to transmit radiation from first ends of the fiber optic filaments to second ends of the fiber optic elements. The first ends of the fiber optic filaments are disposed in an array in the collector unit to receive radiation and second ends are disposed in an array in the lighting module to emit radiation received by the first ends of the fiber optic filaments. Radiation transmitted by the fiber optic filaments illuminates an area external to the lighting module and impinges the photovoltaic element to generate electricity. In one variation, the base of the collector unit includes a wall defining the cavity wherein the wall includes a reflective surface formed on the inside surface of the wall. In other embodiments, the lighting module may include a battery for storing electricity generated by the photovoltaic element.

In one embodiment, a multi-mode lighting system includes a collector unit having a collector base including a wall defining a cavity with a reflective surface. A transparent or translucent cover is mounted on the collector base over the cavity and encloses the cavity. A lighting module of the system includes a module base with a transparent or translucent cover mounted over the module base to form an enclosure with a photovoltaic element mounted within the enclosure. A plurality of fiber optic filaments extend from the collector unit to the lighting module. The fiber optic filaments have first ends disposed in an array in the collector unit to receive radiation and second ends disposed in an array in the lighting module whereby radiation received by the first ends of the fiber optic filaments is transmitted from the collector unit to the lighting module. The transmitted radiation illuminates an area external to the lighting module and impinges the photovoltaic element to generate electricity. In one variation, a plurality of externally powerable light sources are mounted within the enclosure.

The photovoltaic element may have a generally circular geometry and may be configured to extend around an interior circumference of the cover. In another variation, the photovoltaic element comprises a plurality of discreet photovoltaic units mounted within the enclosure. Electricity generated by the photovoltaic element may be used to charge a battery associated with the lighting module. Externally powerable light sources may be mounted within the module and in one variation, the light sources may be light emitting diodes. A light sensor and control unit may be provided to determine the intensity of light in the area illuminated by the lighting module and to power the external light sources as needed to supply the desired level of illumination.

BRIEF DESCRIPTION OF THE DRAWINGS

For a more complete understanding, reference is now made to the following description taken in conjunction with the accompanying Drawings in which:

FIG. 4 is a partial sectional view of a lighting module suitable for use with the system of FIG. 1;

FIG. 5 is a partial top view of the lighting module of FIG. 4 illustrating the arrangement of components in the module;

DETAILED DESCRIPTION

Figure 1:
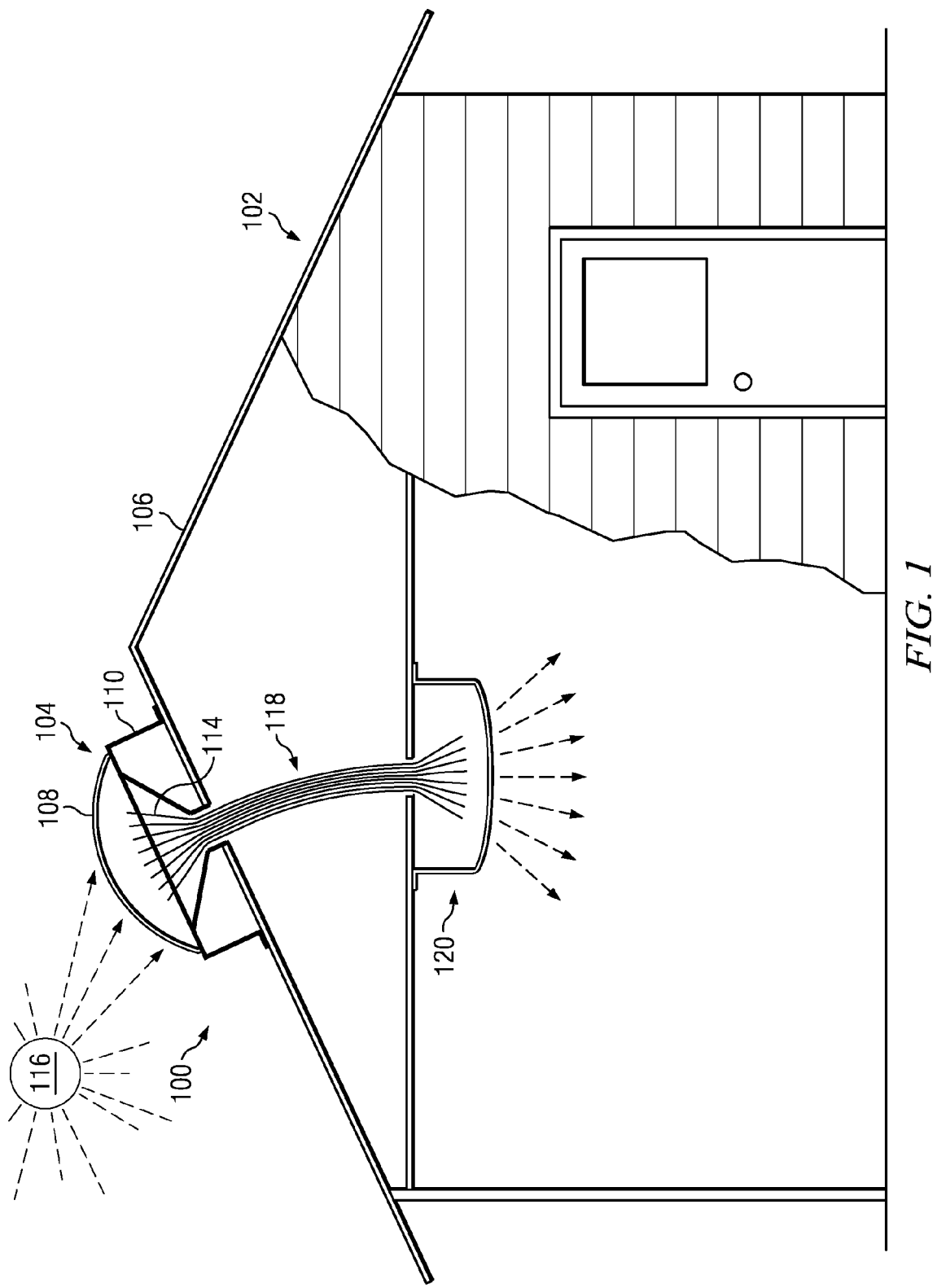
FIG. 1 is a schematic representation of a multi-mode lighting apparatus and system according to the disclosure.

Referring now to FIG. 1, in one embodiment, a system, generally designated 100, for lighting an enclosure such as building 102 includes a collector unit 104, which may be mounted on the roof 106 of the building. In one variation, collector 104 includes a transparent or translucent, high-diffusion, dome-shaped cover 108 mounted on a base or shroud 110. Although as illustrated, cover 108 is dome-shaped or semi-cylindrical, covers having other geometries may be employed.

The first ends of a plurality of fiber optic filaments 114 are exposed within collector 104 to receive radiation (e.g., visible, UV and/or infrared, depending upon the particular fibers) emitted from the sun 116. Fiber optic filaments 114 are fastened together to form a light tube or bundle 118 that extends between collector 104 and a lighting module 120 mounted inside building 102. Fiber optic filaments 114 receive and transmit radiation from collector 104 to interior lighting module 120 to light the interior of building 102. While as shown, module 120 is mounted inside an enclosed structure; in other embodiments, the module may be mounted in other locations where lighting is needed. For example, module 120 may be mounted in a semi-enclosed structure such as a carport or beneath an outdoor canopy.

Figure 2:
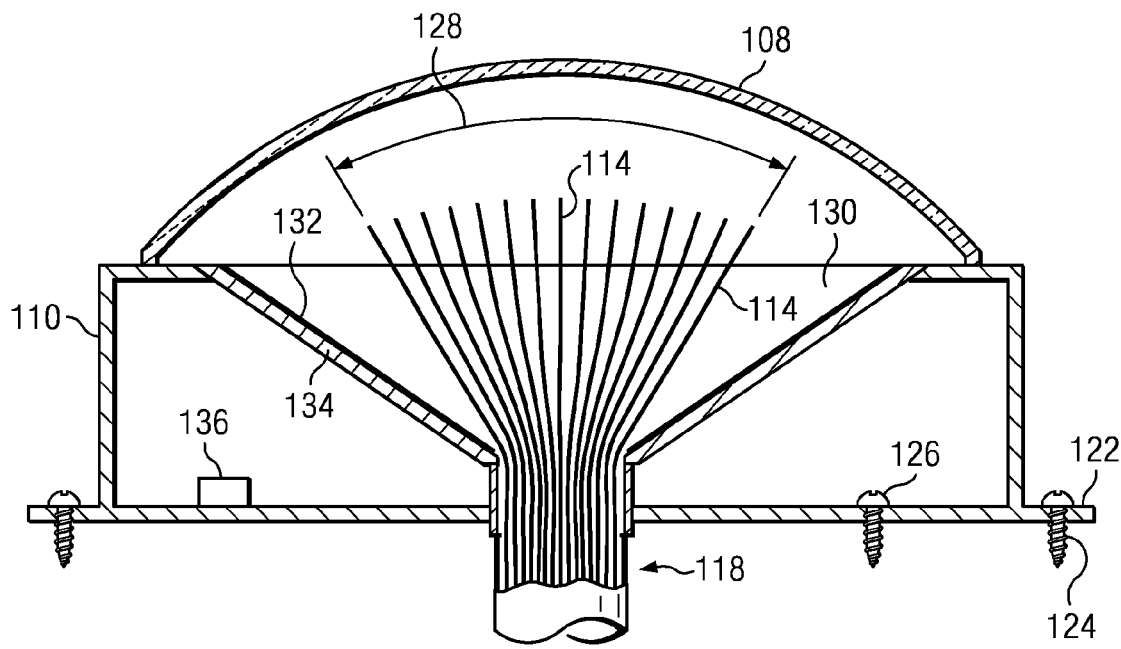
FIG. 2 is a partial sectional view of a collector unit suitable for use with the system of FIG. 1.

FIG. 2 is a partial sectional view taken through collector 104 further illustrating the structure of the collector. As illustrated, cover 108 encloses cavity 130 defined by base 110. In one embodiment, base 110 may include mounting brackets or anchor points 122. Anchor points 122 may be configured to receive anchors 124 to securely mount collector 104 onto roof 106 of building 102 (FIG. 1). Anchors 124 may be nails, screws, bolts or other suitable conventional fasteners. In one embodiment, a plurality of mounting brackets 122 may be located at spaced apart intervals around the circumference of base 110. In another embodiment, a single, collar-shaped mounting bracket 122 may extend continuously around the circumference of base 110. In yet another embodiment, internal anchors 126 may extend from within base 110 into roof 106 of building 102 to secure collector 104 in position.

Figure 3:
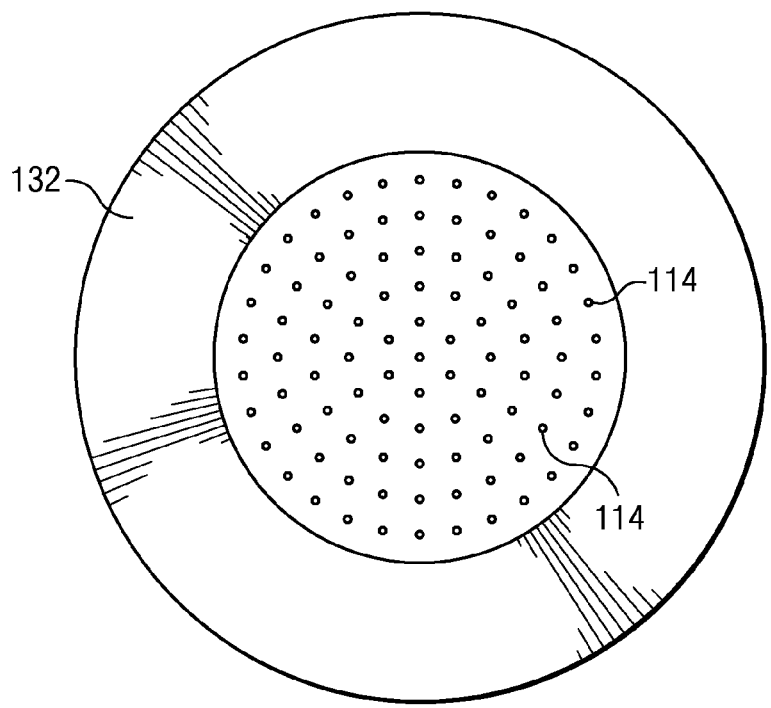
FIG. 3 is a partial top view of the collector unit of FIG. 2 illustrating the arrangement of fiber optic filaments in the unit.

Referring still to FIG. 2, fiber optic filaments 114 may extend from bundle 118 and be arranged in a generally circular array 128 to maximize the amount of radiation collected by the filaments and to avoid interference between the filaments. FIG. 3 is a partial top view of collector 104 further illustrating the arrangement of fiber optic filaments 114 within collector 104. In one embodiment, fiber optic filaments 114 extend from bundle 118 into a cavity 130 formed within base 110. As illustrated, cavity 130 is generally conical or semi-cylindrical; however, other cavities 130 may have different geometries. A reflective coating or layer 132 may be formed over the interior wall 134 of cavity 130 to maximize radiation collection by fiber optic filaments 114. In other embodiments, wall 134 of cavity 130 may be formed from a reflective material, such as a polished metal to accomplish the same effect.

In one embodiment, a light sensor, such as a light detecting chip 136 may be mounted in or on base 110. Light sensor 136 monitors the amount and/or intensity of light passing through cover 108. The output of light sensor 136 may be used to determine the amount of radiation that is, or should be collected by fiber optic filaments 114.

FIG. 4 is a partial sectional view taken through lighting module 120. Module 120 may include a transparent or translucent cover 140 mounted on a base 141 to form an enclosure 143. In one embodiment, cover 140 and base 141 are an integral unit. Base 141 and/or cover 140 may be provided with mounting brackets 142 for mounting module 120 on a structure, for example the ceiling of a structure such as building 102 (FIG. 1). Suitable fasteners 144 may be received through mounting brackets 142 to secure module 120 in position. A control unit 160 and light sensor 162 may be mounted on or adjacent lighting module 120 to control the operation of the unit as hereinafter described. Sensor 162 may determine the intensity of light in the area illuminated by lighting module 120. In various embodiments, lighting module 120 may be provided with a battery or batteries 148 and an external power connection 164 (e.g., 110 AC, 220 DC or other power source) and a transformer 170 to supply power to the module. A manual switch 168 may be provided to activate control unit 160.

Referring still to FIG. 4, fiber optic filaments 114 extend from bundle 118 inside cover 140 with the second ends of the filaments exposed beneath the cover. Fiber optic filaments 114 may be arranged within cover 140 in a circular array as illustrated in FIG. 3 to emit radiation collected by the filaments in collector 104 so as to provide lighting to the area below lighting module 120. In one embodiment, lighting module 120 is also provided with a photovoltaic element 146. In this embodiment, radiation emitted from fiber optic filaments 114 may impinge photovoltaic element 146 to produce electricity. Electricity produced by photovoltaic element 146 may be used to charge battery 148 mounted within cover 140. In other embodiments, battery 148 may be mounted on the exterior surface of lighting module 120 or in another location.

Figure 6:
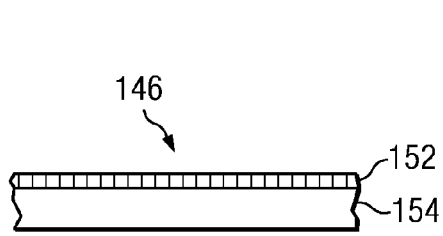
FIG. 6 is a partial cutaway view of a first photovoltaic element for use with the module of FIG. 4.
Figure 7:
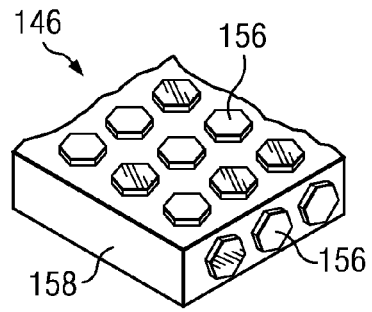
FIG. 7 is a partial cutaway view of an alternate, second photovoltaic element for use with the module of FIG. 4.

FIG. 5 is a partial top view of lighting module 120 further illustrating the configuration of the module. As shown, photovoltaic element 146 has a generally circular or collar shaped geometry and is sized to extend around the interior circumference of cover 140. FIG. 6 is a partial cross sectional view of one embodiment of photovoltaic element 146 wherein, photovoltaic element 146 includes a continuous photovoltaic film 152 applied over a support 154 as shown in FIG. 6. FIG. 7 is a partial cross sectional view of an alternate embodiment of photovoltaic element 146 wherein a plurality of discrete photovoltaic cells 156 are mounted on support 158. Other configurations of photovoltaic element 146 are possible.

Referring still to FIGS. 4 and 5, lighting module 120 may be provided with one or more powered light sources such as LEDs (Light Emitting Diodes) 150 to provide light when the amount of radiation received by collector 104 is insufficient to provide the desired amount of light. A light monitor or sensor 162 may be used to determine the amount and/or intensity of light available in the area illuminated by lighting module 120, typically adjacent to or below the lighting module, to control the operation of LEDs 150. LEDs 150 may be powered in different ways as hereinafter described.

Figure 8:
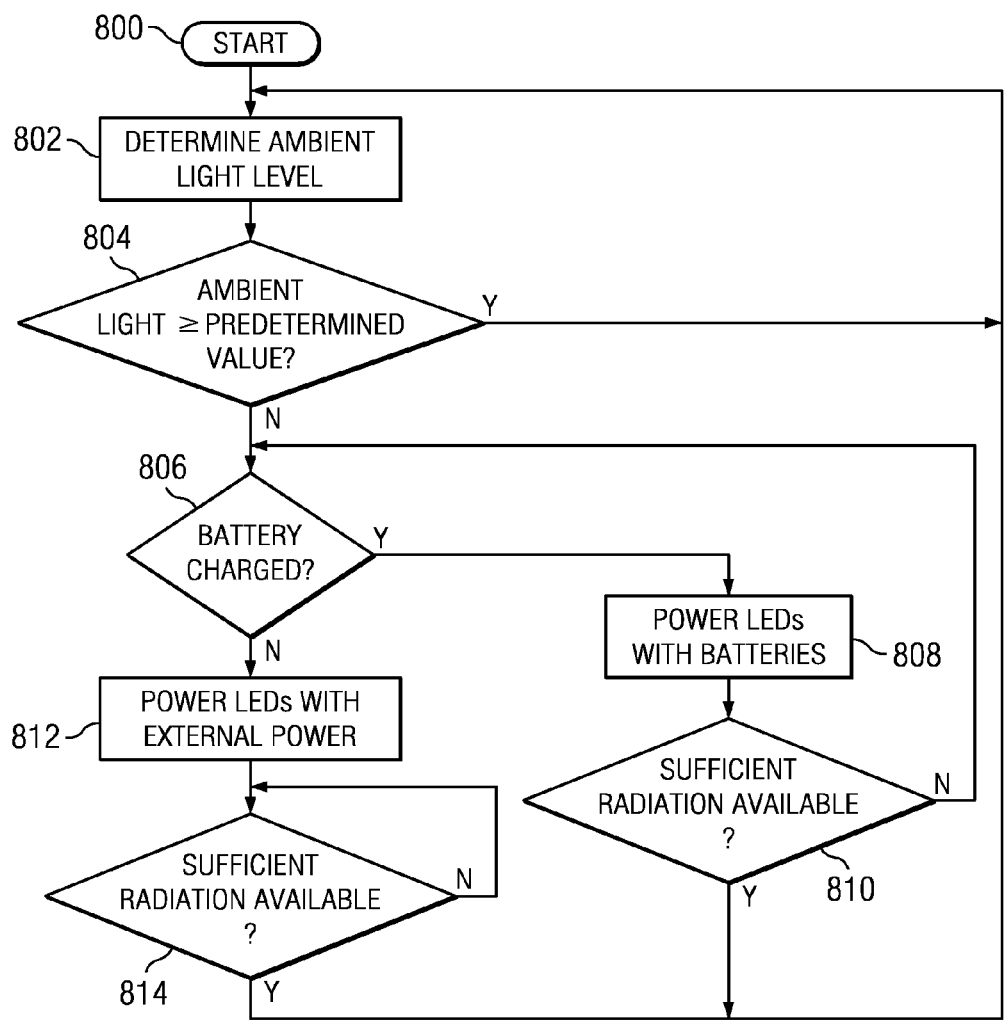
FIG. 8 is a flowchart illustrating one method of operation of the system of FIG. 1.

FIG. 8 is a flowchart illustrating one method of operation of system 100. Referring to FIGS. 4, 5 and 8, the process begins at 800 with the activation of the system, for example, by means of switch 168 (FIG. 4) connected to a control unit 160. Switch 168 may be a manual switch located remote from lighting module 120 at a user convenient location. For example, switch 168 may be a wall-mounted unit mounted at a location readily accessible to a user. In other embodiments, control unit 160 may be activated by a timer (not shown) during predetermined time periods, for example from 7:00 am to 7:00 pm. At step 802, the ambient lighting in the area is determined with light sensor 162 (FIG. 4) which is connected to control unit 160.

The amount and/or intensity of ambient light detected by sensor 162 is compared to a desired predetermined value at step 804. This function may be performed by control unit 160. If the ambient light level is at or above the desired predetermined value, the process loops back to start. The level of ambient light may be monitored continuously, or at predetermined intervals and the sensed level transmitted to control unit 160.

If the ambient light level is below the desired level, at step 806 the charge status of battery or batteries 148 is determined. If battery 148 is charged sufficiently to power LEDs 150, control unit 160 connects the battery to the LEDs at step 808, for example, by means of a solid-state switch 166 or similar device to generate sufficient light to provide the desired predetermined light level. In one embodiment, control unit 160 provides only enough power to LEDs 150 to achieve the desired light level by controlling the voltage and/or current supplied to the LEDs. In this variation, a combination of radiation received by collector 104 and light supplied from LEDs 150 is used to supply the desired level of lighting until the radiation from collector 104 is sufficient to provide the desired level of lighting. When it is determined at step 810 that sufficient light is being received by collector 104 to achieve the desired degree of light, control unit 160 disconnects battery 148, and the process loops back to start.

If the charge level of battery or batteries 148 is insufficient to power LEDs 150, control unit 160 connects external power source 164 to LEDs 150 to illuminate the LEDs at step 812. In one variation, power from external power source 164 is supplied to transformer 170, which converts the external power to a form (typically low voltage, direct current) suitable for powering LEDs 150. Control unit 160 may control the voltage and/or current supplied to LEDs 150 to supply only enough light to achieve the desired predetermined level of lighting. In an alternate embodiment, the step (806) of checking the charge status of battery or batteries 148 may be omitted. In this variation, if LEDs 150 do not provide sufficient light to supply the desired lighting, control unit 160 automatically switches to external power source 164 to illuminate LEDs 150. When it is determined at step 814 that sufficient light is being received by collector 104 to achieve the desired degree of light, control unit 160 disconnects external power source 164 and the process loops back to start.

Power from external power source 164 may also be used to recharge battery or batteries 148 under the control of control unit 160. For example, if control unit 160 determines that battery or batteries 148 are discharged and light sensor or chip 136 in collector 104 (FIG. 2) indicates that no radiation is available to generate power from photovoltaic element 146 (FIG. 2), external power may be used to charge battery or batteries 148. Thus, external power source 164 may be utilized to charge battery or batteries 148 at night or other times when collector 104 is unable to collect sufficient radiation to generate electricity with photovoltaic element 146.

As will be appreciated, numerous variations are possible. For example, a number of discrete devices may be utilized to perform the functions of control unit 160. In other variations, mechanical, electro-optic or magneto-optic switching may be utilized to selectively direct radiation transmitted by fiber optic filaments 114 such that the radiation may be directed to provide lighting or, alternatively, to impinge on photovoltaic element 146 to generate electricity.

It will be appreciated by those skilled in the art having the benefit of this disclosure that the multi-mode lighting system and apparatus disclosed herein provides a means of conserving energy while providing consistent lighting at a desired level. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A multi-mode lighting system comprising:
   a collector unit including:
      a collector base including a cavity;
      a transparent or translucent first cover mounted on the base;
   a lighting module including:
      a module base;
      a transparent or translucent second cover;
      a photovoltaic element; and
   a plurality of fiber optic filaments extending from the collector unit to the lighting module, the fiber optic filaments having first ends disposed in an array in the collector unit to receive radiation and second ends disposed in an array in the lighting module whereby radiation received by the first ends of the fiber optic filaments is transmitted from the collector unit to the lighting module and wherein the transmitted radiation illuminates an area external to the lighting module and wherein transmitted radiation impinges the photovoltaic element to generate electricity.

2. The multi-mode lighting system of claim 1 further comprising a wall defining the cavity; and
   a reflective surface formed on the inside surface of the wall.

3. The multi-mode lighting system of claim 1 further comprising a battery associated with the lighting module and wherein electricity generated by the photovoltaic element is used to charge the battery.

4. The multi-mode lighting system of claim 1 further comprising a light sensor for determining the intensity of light in the area illuminated by the lighting module.

5. The multi-mode lighting system of claim 1 further comprising a plurality of light emitting diodes mounted within the lighting module.

6. The multi-mode lighting system of claim 5 further comprising a control unit, the control unit controlling the operation of the light emitting diodes such that the light emitting diodes are supplied with power such that the light emitting diodes provide light in the illuminated area when the light intensity in the illuminated area drops below a predetermined level.

7. The multi-mode lighting system of claim 6 wherein the light emitting diodes are powered by the battery.

8. The multi-mode lighting system of claim 6 further comprising an external power source for supplying the light emitting diodes with power, wherein the control unit controls the external power source to power the light emitting diodes to provide light in the illuminated area when the light intensity in the illuminated area drops below a predetermined level.

9. The multi-mode lighting system of claim 8 wherein the control unit is operative to select one of the battery or the external power source to supply power to the light emitting diodes.

10. A multi-mode lighting system comprising:
    a collector unit including:
       a collector base including a wall defining a cavity, the base further comprising a reflective surface;
       a transparent or translucent cover mounted on the collector base over the cavity, the cover enclosing the cavity;
    a lighting module including:
       a module base;
       a transparent or translucent cover mounted over the module base to form an enclosure;
       a photovoltaic element mounted within the enclosure;
    a plurality of fiber optic filaments extending from the collector unit to the lighting module, the fiber optic filaments having first ends disposed in an array in the collector unit to receive radiation and second ends disposed in an array in the lighting module whereby radiation received by the first ends of the fiber optic filaments is transmitted from the collector unit to the lighting module and wherein the transmitted radiation illuminates an area external to the lighting module and wherein transmitted radiation impinges the photovoltaic element to generate electricity; and
    a plurality of externally powerable light sources mounted within the enclosure.

11. The multi-mode lighting system of claim 10 wherein the photovoltaic element has a generally circular geometry and is configured to extend around an interior circumference of the cover.

12. The multi-mode lighting system of claim 10 wherein the photovoltaic element comprises a plurality of discreet photovoltaic units.

13. The multi-mode lighting system of claim 10 further comprising a battery associated with the lighting module and wherein electricity generated by the photovoltaic element is used to charge the battery.

14. The multi-mode lighting system of claim 10 wherein the externally powerable light sources comprise a plurality of light emitting diodes mounted within the lighting module.

15. The multi-mode lighting system of claim 14 further comprising a light sensor for determining the intensity of light in the area illuminated by the lighting module.

16. The multi-mode lighting system of claim 15 further comprising a control unit, the control unit operably connected to the light sensor so as to control the operation of the light emitting diodes such that the light emitting diodes are supplied with power such that the light emitting diodes provide light in the illuminated area when the light intensity in the illuminated area drops below a predetermined level.

17. The multi-mode lighting system of claim 16 wherein the light emitting diodes are powered by the battery.

18. The multi-mode lighting system of claim 17 further comprising an external power source for supplying the light emitting diodes with power, wherein the control unit controls the external power source to power the light emitting diodes to provide light in the illuminated area when the light intensity in the illuminated area drops below a predetermined level.

19. The multi-mode lighting system of claim 18 wherein the control unit is operative to select one of the battery or the external power source to supply power to the light emitting diodes.

20. The multi-mode lighting system of claim 16 wherein the control unit is activated by one of a manual switch or timer.

\* \* \* \* \*